UNITED STATES PATENT OFFICE.

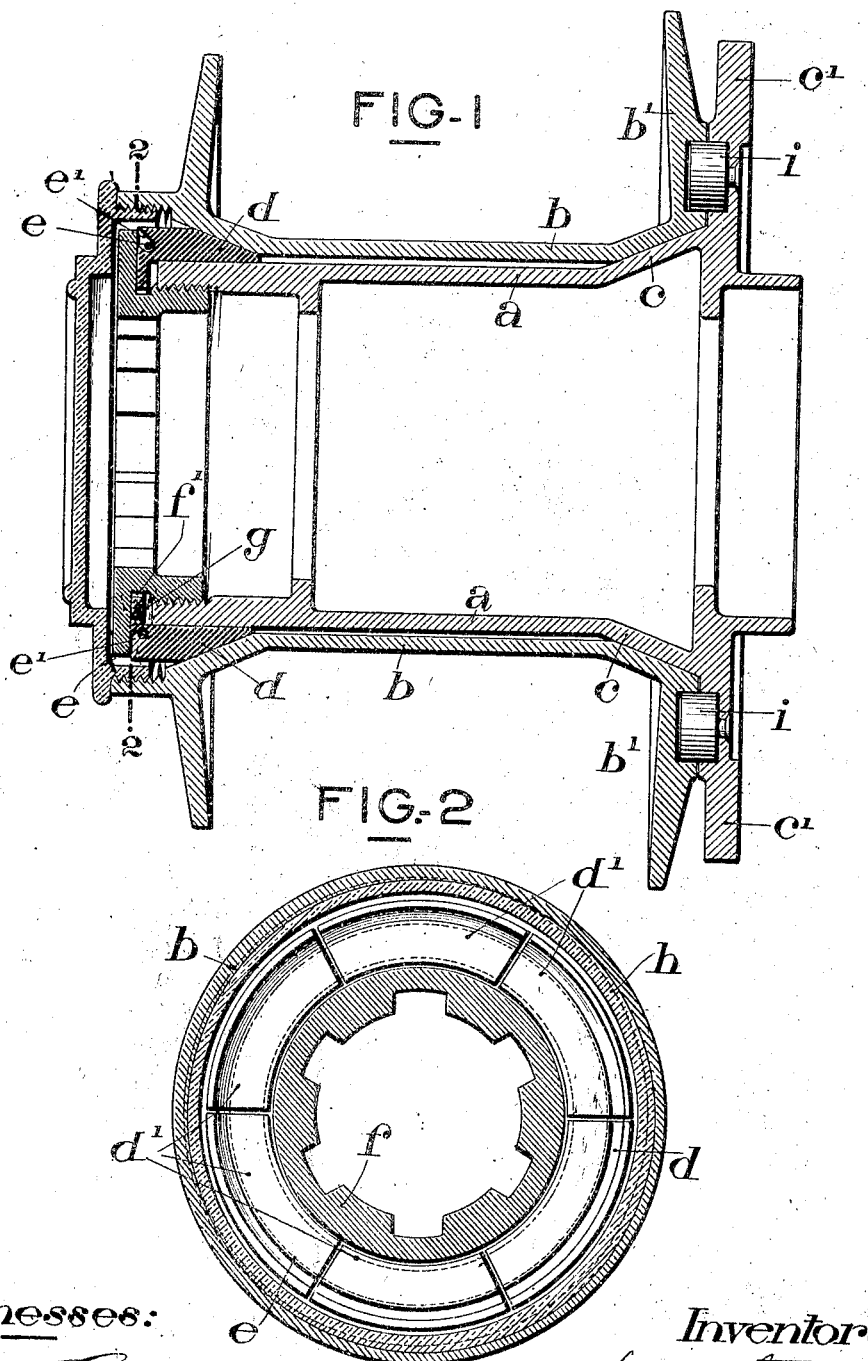

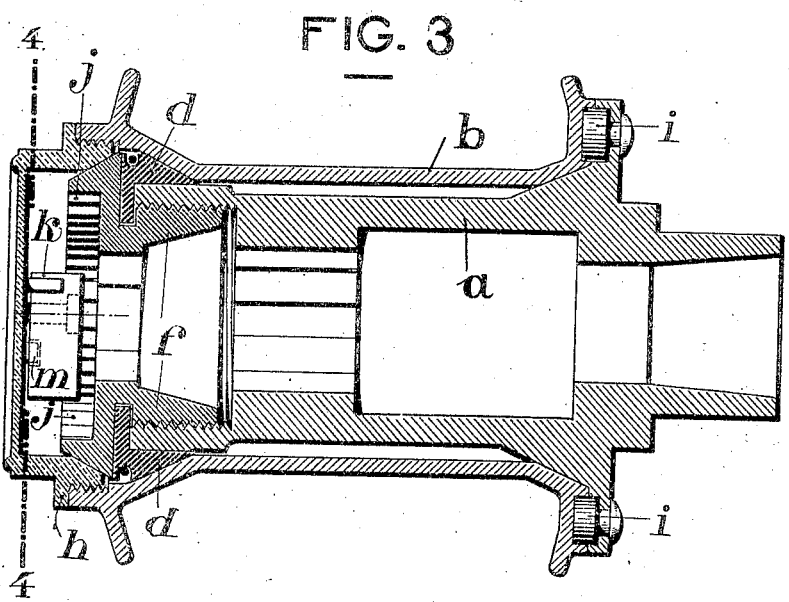
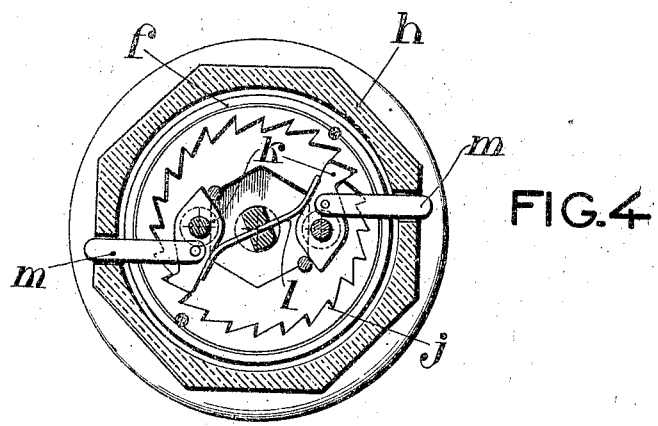

PIERRE LAPERTOT AND ANTOINE FAYARD, OF ST. ÉTIENNE, FRANCE.

HUB FOR DETACHABLE WHEELS.

1,057,561.

Specification of Letters Patent.   Patented Apr. 1, 1913.

Application filed July 30, 1912. Serial No. 712,314.

*To all whom it may concern:*

Be it known that we, PIERRE LAPERTOT and ANTOINE FAYARD, citizens of the French Republic, both residing at St. Étienne, Loire, in France, have invented certain new and useful Improvements in Hubs for Detachable Wheels, of which the following is a specification.

This invention relates to improvements in hubs for detachable wheels more particularly for motor car wheels.

In the annexed drawing: Figure 1 is a longitudinal section of the hub. Fig. 2 is a section on line 2—2 of Fig. 1. Fig. 3 is a longitudinal section of a further form of construction comprising safety means preventing unscrewing of the fixing nut. Fig. 4 is a section on line 4—4 of Fig. 3.

Referring to Figs. 1 and 2, $a$ indicates an inner hub which is mounted on the spindle of the wheel axle and acts as an axle box. The usual transmission members for braking or the like which motor car wheels usually comprise are adapted on this hub. On the hub $a$ a removable hub $b$ is mounted which carries the wheel and which takes support on a conical surface $c$ of the inner hub. The hub $b$ is held at its other extremity by a conical crown member $d$ composed of several sections $d^1$ connected together by a spring $e$ sunk in a channel $e^1$. This crown operates as a wedge between the two hubs $a$ and $b$ and is forced between them by the pressure of a screw plug $f$ which assures firm fixing of the wheel. The plug $f$ has an annular groove $f^1$ in which tongues $g$ formed on each of the sections of the ring $d$ engage so that unscrewing of the plug $f$ has also the effect of withdrawing the crown $d$ which considerably simplifies the operation of unmounting. All these members are protected from dust and dirt, after being put in place, by a screw cap $h$ which at the same time acts as a counter nut and prevents accidental unscrewing of the plug $f$.

If the wheel is a driving wheel the hubs $a$ and $b$ are assembled very firmly together by means of studs $i$ half-embedded in their respective flanges $b^1$ $c^1$ so as to assure transmission to the wheel rim of the driving power or braking received by the hub $a$.

The form of construction shown in Figs. 3 and 4 comprises further safety means for preventing loosening of the parts.

The plug $f$ of the cone $d$ and the cap $h$ screw in reverse directions in the respective hubs $a$ $b$; pawl gear prevents the accidental rotation of one of these members with regard to the other. For this purpose the plug $f$ has a left hand thread and screws to the left and is provided with an interiorly toothed ratchet crown $j$. The cap $h$ has a right hand thread and screws to the right and carries two pawls $k$ which a spring $l$ pushes outward so that when the cap is put in place these pawls engage with the ratchet $j$ of the plug $f$. In this manner no accidental movement of these two pieces can take place as the plug $f$ cannot be unscrewed without rotating the cap $h$ and consequently without tightening it; and the latter cannot unscrew without tightening the plug $f$, which is impossible by reason of the initial tightening of these two parts.

The removal of the cap $h$ to allow removal of the wheel is only possible by pushing back the pawls $k$ to disengage them from the ratchet $j$. For this purpose the cap $h$ is provided with two plungers $m$ accessible from the outside and which when they are pushed inward disengage the pawls from the ratchet sufficiently to allow unscrewing of the cap $h$. These plungers are automatically operated when a spanner is placed on the nut of the cap. When the cap has been removed the unmounting is continued without difficulty by unscrewing the plug $f$ in the suitable direction.

What we claim as our invention and desire to secure by Letters Patent of the United States is:—

1. In a hub for detachable wheels the combination of an inner hub member having a part conical surface at its inner end, an outer hub member engaging on said inner hub member and having a part conical surface coacting with said conical surface of the inner hub member, an annular conical wedging member comprising segments adapted to be engaged between the inner and outer hub members at the outer ends thereof, a screw plug adapted to be screwed into said inner hub member to force the said wedge member between the inner and said outer hubs, tongues on the sections of said wedge member engaging in a groove of the plug, a spring connecting said sections and means for preventing accidental loosening of the parts.

2. In a hub for detachable wheels the combination of an inner hub member having a part conical surface at its inner end, an outer hub member engaging on said inner hub member and having a part conical surface coacting with said conical surface of the inner hub member, an annular conical wedging member comprising segments adapted to be engaged between the inner and outer hub members at the outer ends thereof, means for retaining said segments, a screw plug adapted to be screwed into said inner hub member to force the said wedge member between the inner and outer hubs, a screw cap having a thread of reverse direction to said screw plug, an interiorly toothed ratchet crown on said plug, pawls mounted in said cap adapted to engage with said ratchet to prevent rotation of said plug or said cap, and plungers in said cap for disengaging said pawls from said ratchet to allow unscrewing of said cap.

In witness whereof we have signed this specification in the presence of two witnesses.

PIERRE LAPERTOT.
ANTOINE FAYARD.

Witnesses:
  JEAN GERMAIN,
  JEANNES MOSBABUH.